United States Patent
Sato (10) Patent No.: US 6,721,338 B1
(45) Date of Patent: Apr. 13, 2004

(54) COMMUNICATION APPARATUS, SYNCHRONOUS COMMUNICATION SYSTEM, COMMUNICATION INTERFERENCE SUPPRESS METHOD AND COMPUTER-READABLE RECORDING MEDIUM RECORDED WITH COMMUNICATION INTERFERENCE SUPPRESS PROGRAM TO SUPPRESS INTERFERENCE BETWEEN PLURALITY OF SYNCHRONOUS COMMUNICATION SYSTEMS IN SAME SPACE

(75) Inventor: Koji Sato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/573,342

(22) Filed: May 19, 2000

(30) Foreign Application Priority Data

May 20, 1999 (JP) .......................... 11-139435

(51) Int. Cl.[7] ................................ H04J 3/06
(52) U.S. Cl. ...................... 370/508; 370/345; 370/465; 709/230
(58) Field of Search ................ 370/310, 328, 370/345, 350, 464, 465, 498, 503, 505, 506, 507, 508; 455/39, 500, 502, 63, 557, 73; 709/227, 230, 208, 232, 235

(56) References Cited

U.S. PATENT DOCUMENTS

| | | | | |
|---|---|---|---|---|
| 5,280,498 A | * | 1/1994 | Tymes et al. | 370/328 |
| 5,560,021 A | * | 9/1996 | Vook et al. | 713/323 |
| 6,003,092 A | * | 12/1999 | Waters | 709/248 |
| 6,031,825 A | * | 2/2000 | Kaikuranta et al. | 370/296 |
| 6,370,160 B1 | * | 4/2002 | Knutson et al. | 370/503 |
| 6,603,744 B2 | * | 8/2003 | Mizutani et al. | 370/310 |

OTHER PUBLICATIONS

Boucouvalas Symmetry of IRDA optical links. Optical Free Space Communication Links, IEE Colloquium on Feb. 19, 1996, pp. 6/1–6/8.*
IrDA Control Specification (Formerly IrBus) IrDA CIR (Control IR) Standard Final Specification, Final Revision 1.0, pp. 1–3 & pp. 93–96 (Jun. 30, 1998).

* cited by examiner

Primary Examiner—Hassan Kizou
Assistant Examiner—Dmitry Levitan
(74) Attorney, Agent, or Firm—Birch, Stewart, Kolasch & Birch, LLP (57) ABSTRACT

A synchronous communication system (referred to as system hereinafter) includes one host and at least one peripheral carrying out synchronous communication with the host under control of the host in a predetermined order. When a plurality of adjacent systems are present, the system includes a transmission unit, a reception unit, an error count unit, a packet count unit and a communication timing control unit in the host. The transmission unit transmits a control packet to a peripheral. The reception unit receives from a peripheral a response packet corresponding to the control packet transmitted from the transmission unit. The error count unit counts the number of occurred communication errors and the number of times a response packet was not received by the reception unit within a constant period where synchronous communication is carried out. The packet count unit counts how many of packets transferred in another system is received by the reception unit in the constant period. The communication timing control unit provides adjustment to delay the synchronous communication start timing when determination is made according to the count results that communication interference is occurring between the systems.

12 Claims, 7 Drawing Sheets

COMMUNICATION APPARATUS, SYNCHRONOUS COMMUNICATION SYSTEM, COMMUNICATION INTERFERENCE SUPPRESS METHOD AND COMPUTER-READABLE RECORDING MEDIUM RECORDED WITH COMMUNICATION INTERFERENCE SUPPRESS PROGRAM TO SUPPRESS INTERFERENCE BETWEEN PLURALITY OF SYNCHRONOUS COMMUNICATION SYSTEMS IN SAME SPACE

BACKGROUND OF THE INVENTION

1. Field of the Invention

The present invention relates to a communication apparatus, synchronous communication system, communication interference suppress method and computer-readable recording medium recorded with a communication interference suppress program. Particularly, the present invention relates to a communication apparatus, synchronous communication system, communication interference suppress method and computer-readable recording medium recorded with a communication interferences suppress program to suppress interference caused by a plurality of synchronous communication systems present in the same space.

2. Description of the Background Art

Figure 5A:
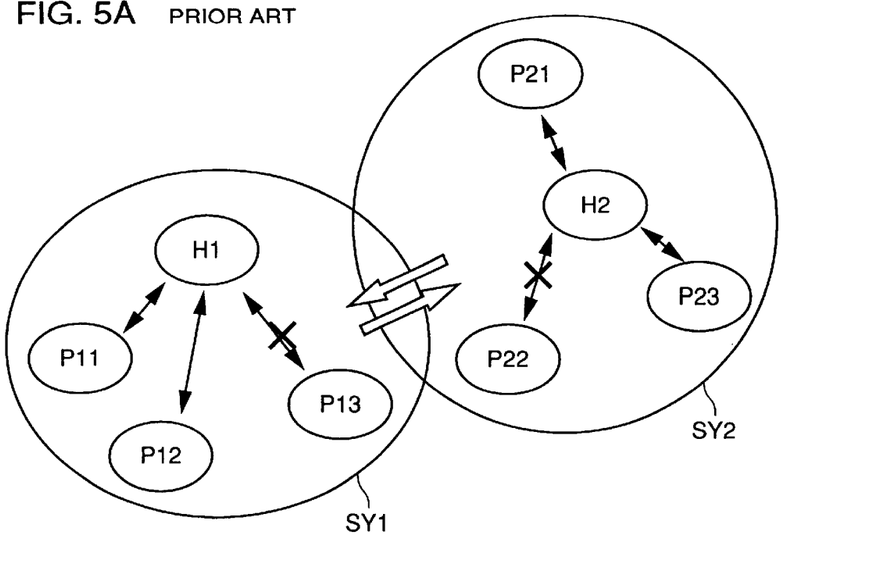
FIGS. 5A and 5B are diagrams to describe the background of the present invention.
Figure 5B:
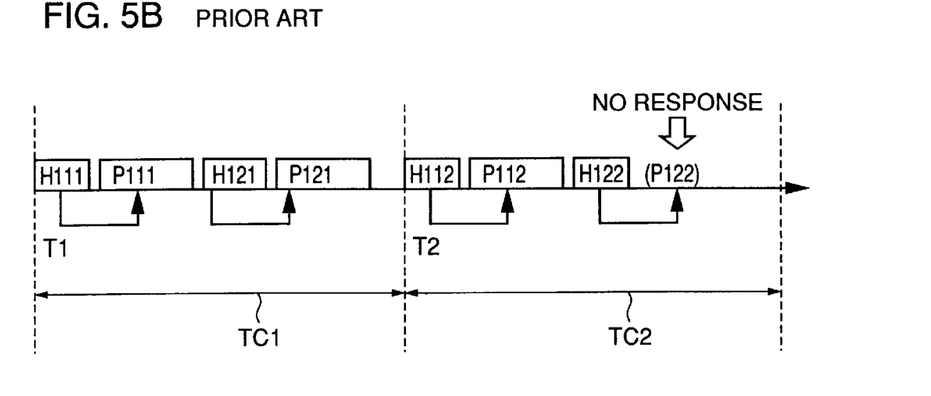

FIGS. 5A and 5B are diagrams to describe the background of the present invention. Referring to FIG. 5A, a plurality of wireless communication systems (simply referred to as "system" hereinafter) are present simultaneously in the same space. Communication of respective systems are effected independently. The signals issued from respective systems during the communication interfere with each other (bold arrow in FIG. 5A) and disturb communication therebetween.

Specifically in FIG. 5A, two systems SY1 and SY2 are present at the same time in the same space. System SY1 includes a host H1 and peripherals P11–P13. System SY2 includes a host H2 and peripherals P21–P23. FIG. 5A schematically shows that the signal issued by the communication of system SY1 affects system SY2 to disturb the communication between host H2 and peripheral P22, and also that the signal issued from the communication of system SY2 affects system SY1 to disturb the communication between host H1 and peripheral P13.

Definition of "the same space" is set forth in the following. In the case where a signal issued from a system affects another system when a plurality of systems are operated adjacent to each other at the same time, i.e., interference occurs by the signal, the plurality of systems are located in the same space.

Definition of a host and a peripheral is set forth in the following. In a 1-N communication system where communication is to be carried out between one host and N (N≧1) peripherals, the host is a control station to control communication in that system whereas a peripheral is a controlled station subjected to communication-operation under control of the host.

In order to suppress the effect of interference caused by a signal from another system, control must be provided to assign a communication processing time for each system by time-division method and carry out the communication process only during the communication processing time assigned to respective systems.

In order to operate simultaneously a plurality of systems that carry out 1-N communications, a centralized control system or a decentralized control system can be employed. In the centralized control system, a station that is a third party is provided to directly control the host that carries out centralized control in each system. By time-dividing and applying the aforementioned communication processing time which is the communication executable time with respect to each system, arbitration of the communication process between the systems is provided. In the decentralized control system, the host in each system adjusts the processing time applied to its own system in an autonomous distributed method.

In the centralized control system, a third party station to provide arbitration of the communication process between the systems must be prepared to provide control of respective hosts. Also, the control procedure employed between the hosts and the station that carries out arbitration must be defined. It is to be noted that this system to provide control of the hosts is not required all the time. Provision of such a station is effective only in the case where there are a plurality of systems at the same time in the operating environment of that station. In an operating environment where there is only a single system, the station will not provide any function and the feature to control the host will not be used efficiently. Thus, many resources will be wasted.

The IrDA Control Specification ((Formerly IrBus) Final Specification—Final Revision 1.0, Jun. 30, 1998) is known as one distributed communication system. According to the this specification, transmission/reception control is effected in a centralized manner between the host and a plurality of peripherals to support communication between one host and a plurality of peripherals. By shifting the communication timing between the plurality of 1-n communication systems in a predetermined band tolerance, the plurality of systems can be operated simultaneously.

Details will be described hereinafter with reference to FIGS. 5B and 6.

FIG. 5B shows the control in the IrDA (Infrared Data Association) Control communication system where two peripherals are registered for one host. A synchronous communication system is set forth in the following. Control of each peripheral is administered at a constant time interval (referred to as "cycle" hereinafter). The host issues a control packet for a relevant peripheral at every cycle. The peripheral receives the control packet issued from the host. In the case where there is transmission data or the like to the host, a response packet is transmitted following the control packet reception. Thus, data is transferred.

In cycle TC1 starting at time T1 in FIG. 5B, the host first transmits to one peripheral (peripheral 1) a control packet H111 (the packet from the host to peripheral 1 at time T1). If peripheral 1 has data to be transferred to the host at the current stage, peripheral 1 transmits the transmission data through a packet P1 in response to control packet H111 from the host. Following transmission of the control packet to peripheral 1, the host transmits a control packet H121 to the other peripheral (peripheral 2) within the same cycle TC1. Peripheral 2 determines the presence of transfer data, and sends it, if any, through a packet P121 in response to control packet H121.

After the elapse of cycle TC1, a new cycle TC2 starts at time T2. The host carries out a control process similar to that of cycle TC1 during cycle TC2 with respect to the two registered peripherals.

In cycle TC2, the host provides control with respect to peripheral 1 (control and response through packets H112 and P112), and then sends control packet H122 during control of peripheral 2. If peripheral 2 has no data prepared to be transmitted to the host, a response does not have to be issued with respect to packet H122.

Figure 6:
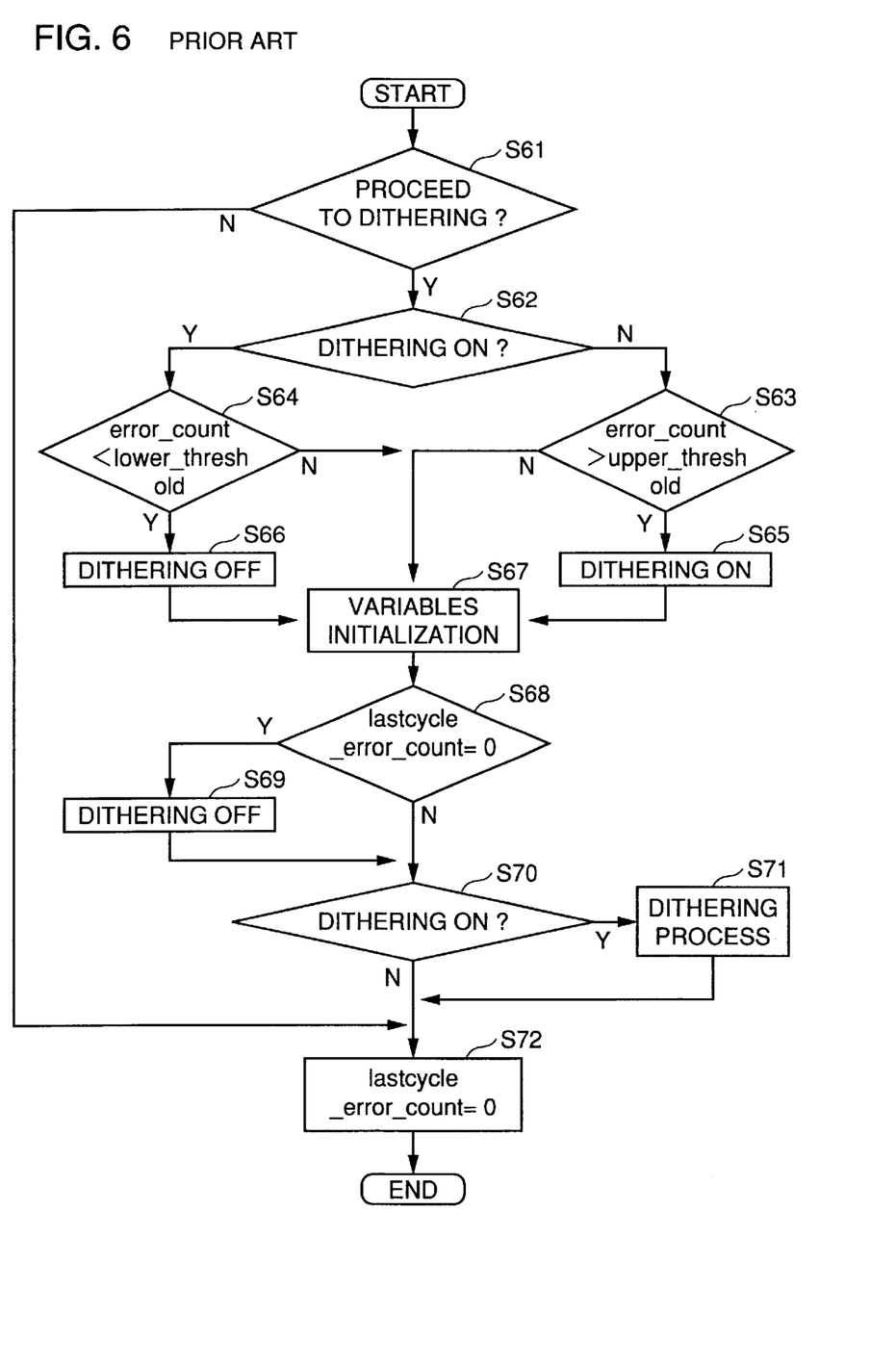
FIG. 6 is a flow chart showing a dithering algorithm according to the IrDA control communication system.

FIG. 6 is a flow chart of the dithering algorithm which is the frame to shift the communication execution timing defined in the IrDA control specification.

When there is no response of a packet from a peripheral (referred to as "no-packet response" hereinafter) during the normal cycle process of FIG. 5B, or when an error is encountered during communication, the host increments a variable "error_count". At the same time, a variable "lastcycle_error_count" is also incremented. The value of variable "lastcycle_error_count" is used as the counter to detect no-packet response and also communication error during the immediately-proceeding single cycle. The value of variable "error_count" is employed as a counter to count the no-packet response and communication error during a plurality of cycles starting from the previous determination process to proceed to the dithering process up to the determination process to proceed to the next dithering process. The processes for these variables are executed at an arbitrary cycle to be used as the basis of determining whether dithering determination is to be carried out or not.

Following the communication cycle processes that are sequentially executed, control proceeds to step S61 where determination is made to move to the determination phase of executing a dithering process or not. Since the dithering process is executed at an elapse of a constant number of cycle processes (generally, 5 cycles), control does not proceed to the phase of S62 et seq. when the required number of cycles has not elapsed.

In the case where shift to the dithering determination phase is not made (N at S61), control proceeds to step S72 to clear the value of variable "lastcycle_error_count". By this procedure, the latest error information as to the single cycle immediately proceeding the dither determination phase is stored in variable "lastcycle_error_count".

In the case where determination is made to execute a dithering process (Y at S61), control proceeds to step S62 to check the dithering setting. The dithering setting is in a sense a switch to define whether a dithering process is to be carried or not at step S71, and takes either an ON or OFF state. If the setting does not correspond to a dithering process (OFF state), control proceeds to step S63 to refer to the value of variable "error_count". If this value exceeds a predetermined upper limit threshold (the value of variable "upperthreshold") (Y at S63), the dithering setting is rendered ON at step S65, and control proceeds to step S67. If the case where the value of variable "upper threshold" is not exceeded (N at S63), control proceeds to step S67. At step S67, initialization of variable "error_count" and the variable to count the number of cycles to determine transition to a dithering process, if employed, is carried out.

In the case where the setting of step S62 already corresponds to a dithering process (ON state), control proceeds to step S64 to refer to the value of variable "error_count". If this value is lower than a predetermined lower limit threshold (value of variable "lower_threshold"), the dithering setting of ON in step S66 is turned OFF, and control proceeds to step S67. When the value is not lower than the lower limit threshold, control proceeds to step S67 with the setting still at the ON state.

Following initialization of variables at step S67, control proceeds to step S68 to refer to the value of variable "lastcycle_error_count". When the value is 0, control proceeds to step S69 to render the dithering setting OFF, otherwise, control proceeds to step S70 to check the dithering setting. If the dithering setting is ON, the dithering process of step S71, i.e. a process delayed by a period of time corresponding to calculation of the frame process start timing as to the next communication execution using a random number is executed. Following the dithering process of step S71, control proceeds to step S72 to clear the value of variable "lastcycle_error_count".

Thus, the host operates to suppress any communication disturbance caused by influence from another system by delaying the corresponding frame process start timing. By virtue of this system, a plurality of 1-N systems can be operated simultaneously within the usable range of the bandwidth.

In the case where response data is not provided from a peripheral in the above-described communication system, the counters will be incremented as in the event of communication error occurrence. Therefore, the precision in determining modification of the start timing of synchronous communication is inferior. In the case where there are no more transfer data from all the peripherals registered with respect to the host in a certain system, the start timing of synchronous communication is inevitably delayed within a constant period of time. Since this synchronous communication start timing delay is effected even though there is no transfer data from the peripheral, there will be no merit as to the system per se. Furthermore, there is a possibility of the communication of another system that was carried out properly being disturbed by the interference caused by modification (delay) of the synchronous communication start timing of that system. Since the synchronous communication start timing modification is continued intermittently even during the period where there is no transfer data from a peripheral, interference will also occur continuously.

In order to suppress the wasteful delay process of the synchronous communication start timing in the above communication system, the number of communication errors during the communication cycle process immediately preceding the process of determining whether to execute the process or not is counted (count value set to variable "lastcycle_error_count") to suppress the synchronous communication start timing delay execution when the counted value is 0. Also, execution of the synchronous communication start timing delay can be suppressed only under the circumstance where there is a response packet from all the peripherals registered in the host and there is no communication error in the previous communication cycle. Particularly in the case of infrared communication where there is not always a response from a peripheral since it is necessary to suppress power consumption for light emission at the time of packet transmission, delay of the synchronous communication start timing that is not required in the above communication system will be executed, so that communication disturbance cannot be improved.

SUMMARY OF THE INVENTION

An object of present invention is to reduce communication interference when there are a plurality of adjacent synchronous communication systems.

According to an aspect of present invention, a synchronous communication system includes one control apparatus, and at least one controlled apparatus that carries out synchronous communication with the control apparatus under control of the control apparatus in a predetermined order. When a plurality of such synchronous communication systems are present adjacent to each other, each of the plurality of synchronous communication systems includes a transmission unit, a receiver unit, an error count unit, a packet count unit, and a communication timing adjustment unit in the control apparatus.

The transmission unit transmits a packet in which control information is stored to at least one controlled apparatus. The receiver unit at least receives a packet stored with a response corresponding to the contents of the packet transmitted from the transmission unit from at least one controlled apparatus. The error count unit counts the number of synchronous communication errors occurred and the number of times a packet from at least one controlled apparatus was not received by the receiver unit during a constant period of time where synchronous communication is carried out with at least one controlled apparatus. The packet count unit counts how many of packets transferred in another system is received by the receiver unit during the constant period of time. The communication timing adjustment unit adjusts the synchronous communication timing according to a predetermined procedure based on the count result of the error count unit and the packet count unit.

In the above-described synchronous communication system, the synchronous communication start timing is appropriately adjusted based on information of the no-packet response frequency from at least one controlled apparatus and communication error occurrence frequency and also on information of packet reception from another system. Thus, in an environment where another system is present in an adjacent manner in the same space, communication disturbance caused by interference of the signal of another system can be avoided. A plurality of synchronous communication systems can coexist in the usable range of the bandwidth.

In the above-described synchronous communication system, the communication timing adjustment unit includes a determination unit to determine whether to adjust the synchronous communication timing or not based on the count result of the error count unit and the packet count unit. The synchronous communication timing can be adjusted according to a predetermined procedure based on the determination result of carrying out adjustment by the determination unit.

In the above-described synchronous communication system, the predetermined procedure can indicate replacement of the predetermined order between the controlled apparatus that did not receive a corresponding packet over the constant period of time by the receiver unit and another of the controlled apparatus.

In the case where the control apparatus does not receive a packet response from a controlled apparatus over the constant period of time in the above-described synchronous communication system, the predetermined order of control as to the controlled apparatus, i.e., the order of issuing the packet stored with control information can be replaced with that of another controlled apparatus that has packet response. As a result, definite identification can be made whether no-packet response from the controlled apparatus correspond to absence of transmission data or due to some communication error. Thus, communication timing adjustment of high accuracy is allowed.

The predetermined procedure in the above-described synchronous communication system can be implemented to conform to a rule selected according to the count result of the error count unit and the packet count unit out of one or more rules prepared in advance to adjust the synchronous communication timing.

In the above-described synchronous communication system, flexible timing adjustment is allowed by carrying out communication timing adjustment according to a rule selected based on a frequency of no-packet response from a controlled apparatus and communication error occurrence frequency, and also information of packet reception from another system. Thus, timing adjustment of high adaptivity with respect to the communication status can be carried out.

In the above-described synchronous communication system, the error count unit can count the synchronous communication error with a predetermined weight. The number of times a packet was not received from at least one controlled apparatus by the reception unit can be count with a weight lower than the predetermined weight.

In the above-described synchronous communication system, the number of no-packet responses from a controlled apparatus is count with a relatively low weight, whereas the number of occurred transmission errors is counted with a relatively higher weight. Communication timing adjustment is carried out according to such counted results. In the event where communication error occurrence can be identified definitely, the synchronous communication timing can be modified at an early stage. In the case of a no-packet response from a controlled apparatus with the possibility being caused by absence of data to be originally transmitted, the synchronous communication timing modification is suppressed taking into consideration the effect of modification to its own system and influence on the communication of another system. Therefore, synchronous communication timing adjustment that is simple and effective can be carried out.

The predetermined procedure can be implemented to designate that the synchronous communication timing is not adjusted in the case where the count result of the error count unit indicates that no communication error has occurred and a packet from at least one controlled apparatus was not received, and the count result by the packet count unit indicates that a packet transferred in another synchronous communication system has been received by the reception unit.

In the above-described synchronous communication system, the synchronous communication timing adjustment of its own system is suppressed in the case where there is no communication error and no packet response from a controlled apparatus, and the presence of another system, i.e., a packet from another system, can be detected. As a result, interference as to communication between one system and another system can be avoided, and influence to communication of another system can be suppressed.

In the above-described synchronous communication system, the control apparatus can be configured to adjust the synchronous communication timing according to time information corresponding to the start of synchronous communication until occurrence of communication error or until the time when a packet was not received from at least one controlled apparatus.

In the above-described synchronous communication system, the time from the start of synchronous communication up to the no-packet response from a controlled apparatus or communication error occurrence is measured. The synchronous communication timing is adjusted based on the measured result. The information of the time up to error detection is fed back to the amount of adjustment of the synchronous communication timing to increase or reduce the adjustment amount when the time up to error detection is short or long, respectively. The interference period can be gradually reduced as the interaction between the systems encountering interference. Accordingly, recovery from the communication disturbance caused by interference can be carried out by a stable operation.

According to another aspect of the present invention, a communication interference suppress method is to suppress interference of communication of respective plurality of adjacent synchronous communication systems. The synchronous communication system includes one control apparatus, and at least one controlled apparatuses carrying out synchronous communication with the control apparatus under control of the control apparatus at a predetermined order. The method includes a transmission step, a reception step, an error count step, a packet count step, and a communication timing adjust step in the control apparatus.

In the transmission step, a packet in which control information is stored is transmitted to at least one controlled apparatus. In the reception step, at least a packet storing response corresponding to the contents of the packet transmitted at the transmission step is received from at least one controlled apparatus. In the error count step, the number of synchronous communication errors occurred and the number of times a packet was not received from at least one controlled apparatus in the reception step during a constant period of time carrying out synchronous communication with at least one controlled apparatus are counted. In the packet count step, the number of packets transferred in another synchronous communication system and received at the reception step during the constant period of time is counted. In the communication timing adjust step, the synchronous communication timing is adjusted according to a predetermined procedure based on the count result of the error count step and the packet count step.

According to a further aspect of the present invention, a communication apparatus is provided in each of a plurality of adjacent synchronous communication systems. Each of the plurality of synchronous communication systems includes one communication apparatus, and at least one controlled apparatus carrying out synchronous communication with the communication apparatus and controlled. The communication apparatus includes a transmission unit, a reception unit, an error count unit, a packet count unit, and a communication timing adjustment unit.

A packet stored with control information is transmitted by the transmission unit to at least one controlled apparatus. At least a packet stored with response corresponding to the contents in the packet transmitted by the transmission unit from at least one controlled apparatus is received by the reception unit. The error count unit counts the number of synchronous communication errors occurred and the number of times a packet has not been received from at least one controlled apparatus by the reception unit during a constant period of time carrying out synchronous communication with at least one controlled apparatus. The packet unit counts how may of packets transferred in another synchronous communication system is received by the reception unit during the constant period. The communication timing adjustment unit adjusts the synchronous communication timing according to a predetermined procedure based on the count result of the error count unit and the packet count unit.

According to still another aspect of the present invention, a recording medium is recorded with a communication interference suppress program for a computer to execute a communication interference suppression method to prevent communication interference in a plurality of adjacent synchronous communication systems. The synchronous communication system includes one control apparatus, and at least one controlled apparatus carrying out synchronous communication with the control apparatus under control of the control apparatus in a predetermined order. The communication interference suppress method executed according to the communication interference suppress program includes a transmission step, a reception step, an error count step, a packet count step and a communication timing adjust step in the control apparatus.

In the transmission step, a packet stored with control information is transmitted to at least one controlled apparatus. In the reception step, a packet stored with response corresponding to the contents of the packet transmitted in the transmission step from at least one controlled apparatus is received in the reception step. In the error count step, the number of synchronous communication errors occurred and the number of packets not received from at least one controlled apparatus by the reception unit are counted in a constant period of time where synchronous communication with at least one controlled apparatus is carried out. In the packet count step, the number of packets transferred in another synchronous communication system and received in the reception step during the constant period is counted. In the communication timing adjustment step, the synchronous communication timing is adjusted according to a predetermined procedure based on the count result of the error count step and the packet count step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

First Embodiment

FIGS. 1A–1D show a wireless communication system according to an embodiment of the present invention.

Figure 1A:
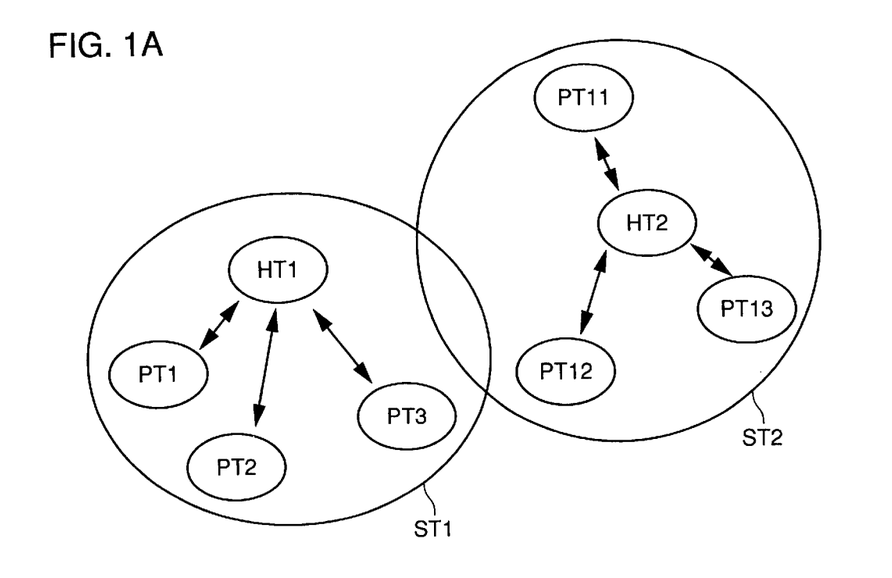
FIGS. 1A–1D are diagrams to describe a structure of a communication system according to embodiments of the present invention.

FIG. 1A shows a state where a plurality of wireless communication systems are present in the same space. Although the case is shown where two wireless communication systems (simply referred to as "system" hereinafter) are present in the same space, the present invention is not limited to two wireless communication systems in the same space, and three or more systems may be present at the same time.

Referring to FIG. 1A, two systems ST1 and ST2 are present at the same time in the same space. System ST1 includes a host HT1 and peripherals PT1, PT2 and PT3 registered as apparatuses communicating with host HT1. System ST2 includes a host HT2 and peripherals PT11, PT12 and PT13 registered as apparatuses communicating with host HT2. Although three peripherals are registered for the host in the system, the number of peripherals registered in each system is not limited to three, and may be at least one.

Figure 1B:
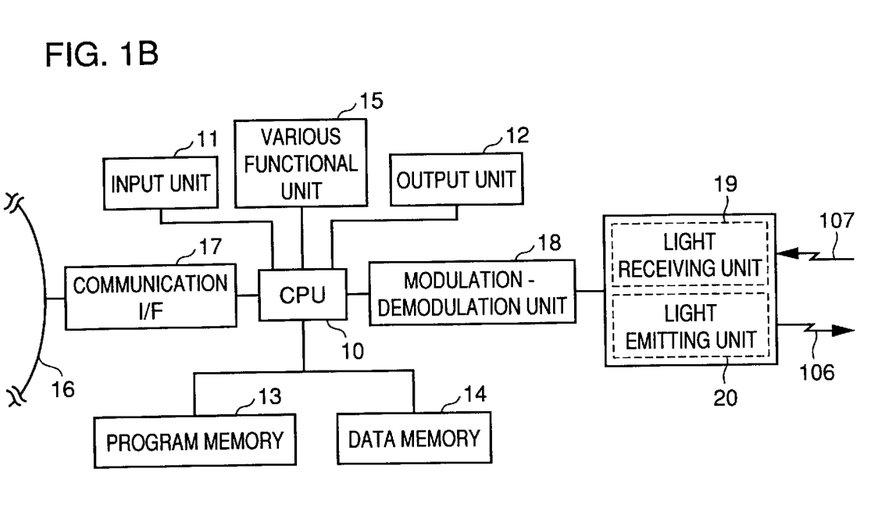

FIG. 1B shows a system structure of the host according to the present invention. The structure of FIG. 1B is commonly applied to the host of the embodiment of the present invention. A wireless mouse or keyboard are envisaged as the peripheral corresponding to this host. Referring to FIG. 1B, the host includes a CPU (Central Processing Unit) 10 to control and monitor the host per se in a centralized manner, an input unit 11 to input various information, an output unit 12 to output various information, a program memory 13 storing various programs, a data memory 14 storing various data, various functional unit 15 to execute various functions independently of the host, a communication I/F (interface) 17 to provide communication connection between a communication network 16 and CPU 10, a modulation-demodulation unit 18, a light receiving unit 19 formed of a light receiving element such as a photodiode to receive a signal 107 by infrared light, and a light emitting unit 20 formed of a light emitting element such as a light emitting diode emitting light of infrared ray to transmit a signal 106. Modulation-demodulation unit 18 modulates transmitted data into a light signal to transmit a signal 106 at light emitting unit 20, and also demodulates a signal 107 received by light receiving unit 19. Various communication networks including the Internet can be applied for communication network 16.

Figure 1C:
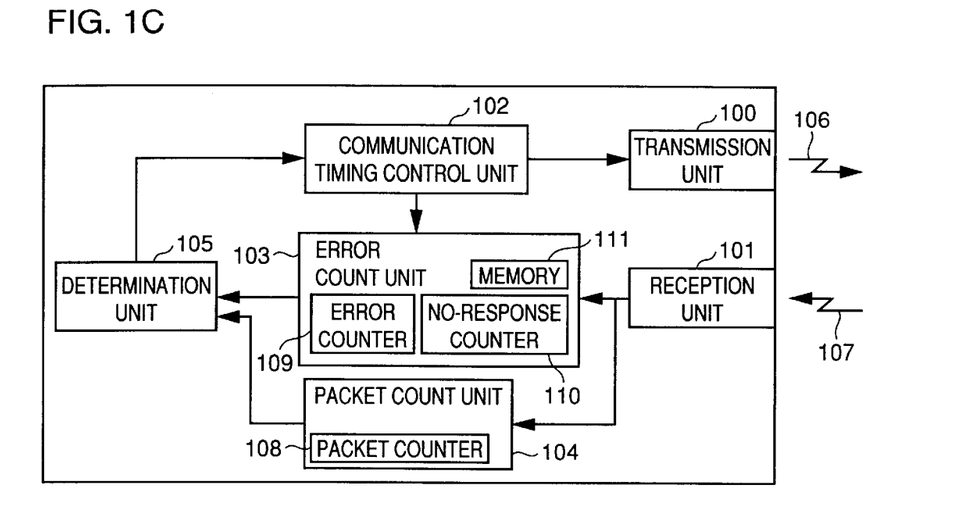
Figure 1D:
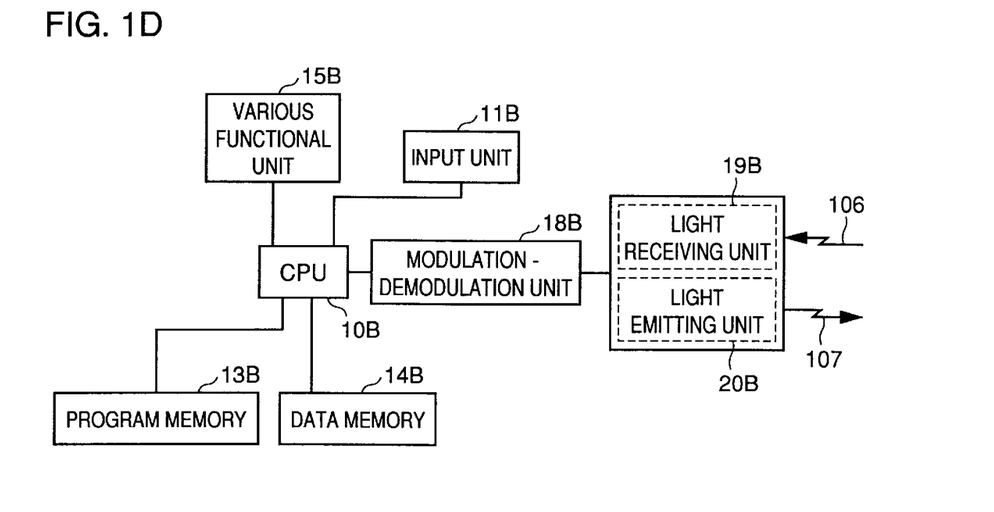

FIG. 1C shows the functional structure related to the infrared communication system of the host according to the embodiment of the present invention. FIG. 1D shows the system structure of the peripheral according to the embodiment of the present invention. FIG. 1D shows the structure of a wireless mouse, for example, and includes a CPU 10B, an input unit 11B, a program memory 13B, a data memory 14B, various functional unit 15B, a modulation-demodulation unit 18B, a light receiving unit 19B and a light emitting unit 20B. Input unit 11B includes a switch button. When this switch button is clicked, that information is applied to CPU 10B. The operation of the wireless mouse is well known, so that description thereof will not be provided here. Each of CPU 10B—light receiving unit 20B (excluding input unit 10B) functions likewise the corresponding components shown in FIG. 1B.

Referring to FIG. 1C, to realize a communication system, the host includes a transmission unit 100, a reception unit 101, a communication timing control unit 102, an error count unit 103 which has an error counter 109, a no-response counter 110 and a memory 111, a packet count unit 104 which has a packet counter 108, and a determination unit 105. The functions of these units are stored in program memory 13 as a program and executed under control of CPU 10.

Transmission unit 100 transmits from the host to respective registered peripherals a control packet as signal 106 through light emitting unit 20. The timing to transmit the control packet to each peripheral is controlled by communication timing control unit 102.

Therefore, transmission unit 100 is directly controlled by communication timing control unit 102. The control packet can also store data to be transmitted from the host to a peripheral in addition to the control information towards each peripheral.

Reception unit 101 functions to receive signal 107 transmitted from a peripheral using light receiving unit 19 and to detect a communication packet in another system. Since the communication packet of another system has a different field information such as the ID or the like, identification and detection can be made between the communication packet transferred within its own system or a communication packet from another system by checking one part of the information. Notification of a communication packet of another system, when detected, is provided to packet count unit 104.

"No-packet response" implies the case where, following transmission of a control packet to a peripheral from the host, a response packet corresponding to that control packet is not received from that peripheral within a constant period of time. When packet count unit 104 is notified of detection of a communication packet of another system from reception unit 101, packet count unit 104 increments the value of packet counter 108 to store the detected number of times, and provides the value of packet counter 108 to determination unit 105.

Error count unit 103 detects a communication error, if any, such as CRC (Cyclic Redundancy Check) error due to some disturbance including interference from another system in the packet received at reception unit 101, and increments the value of error counter 109 to store the number of occurrence of communication error. Also, error count unit 103 determines from the information of reception unit 101 whether a response packet has been received or not within a defined timing after transmission of a control packet to a peripheral based on transmission information of a control packet to a peripheral from communication timing control unit 102. In the case where packet response is not received in the defined timing from the relevant peripheral, the value of no-response counter 110 to store the number of times the response packet was not received is incremented, and the value of no-response counter 110 is reflected into the value of error counter 109.

Reflection to the value of error counter 109 is set forth in the following. In the general detection of no-packet response, 1 is added to the value of error counter 109. Here, a relatively low weight can be applied on the occurrence of the no-packet response in comparison with the occurrence of communication error. This weight can be reflected to the value of error counter 109. Applying a weight whose value is greater than 0 and smaller than 1 is applied to the value of error counter 109. The value of error counter 109 is provided to determination unit 105.

In the event where occurrence of communication error can be definitely identified, the synchronous communication start timing is modified promptly, and the priority as to the timing modification is set low in the case of no-packet response. This no-packet response from a peripheral includes the possibility that the peripheral is absent of data to be transmitted. Therefore, there is a possibility that modifying the synchronous communication start timing based on the reflection of the frequency of detected no-packet response onto the value of error counter 109 has no advantage for the system. Furthermore, there is a possibility of the useless modification of the synchronous communication start timing disturbing communication of another system whose communication was properly executed. In such a case, modification of the synchronous communication start timing must be suppressed. It is expected that this requirement can be satisfied by applying weight to the value of error counter 109.

Error count unit 103 may count the period of time up to detection of no-packet response from a peripheral or occurrence of communication error from notification of the start of synchronous communication from communication timing control unit 102, and sequentially maintain that information.

Determination unit 105 is actuated at every constant cycle to determine modification of the synchronous communication start timing according to the values of counters 108 and 109 applied by error count unit 103 and packet count unit 104, respectively, and notify determination of modification to communication timing control unit 102. Communication timing control unit 102 controls transmission unit 100 to modify the synchronous communication start timing of the host according to the contents notified by determination unit 105.

Figure 2:
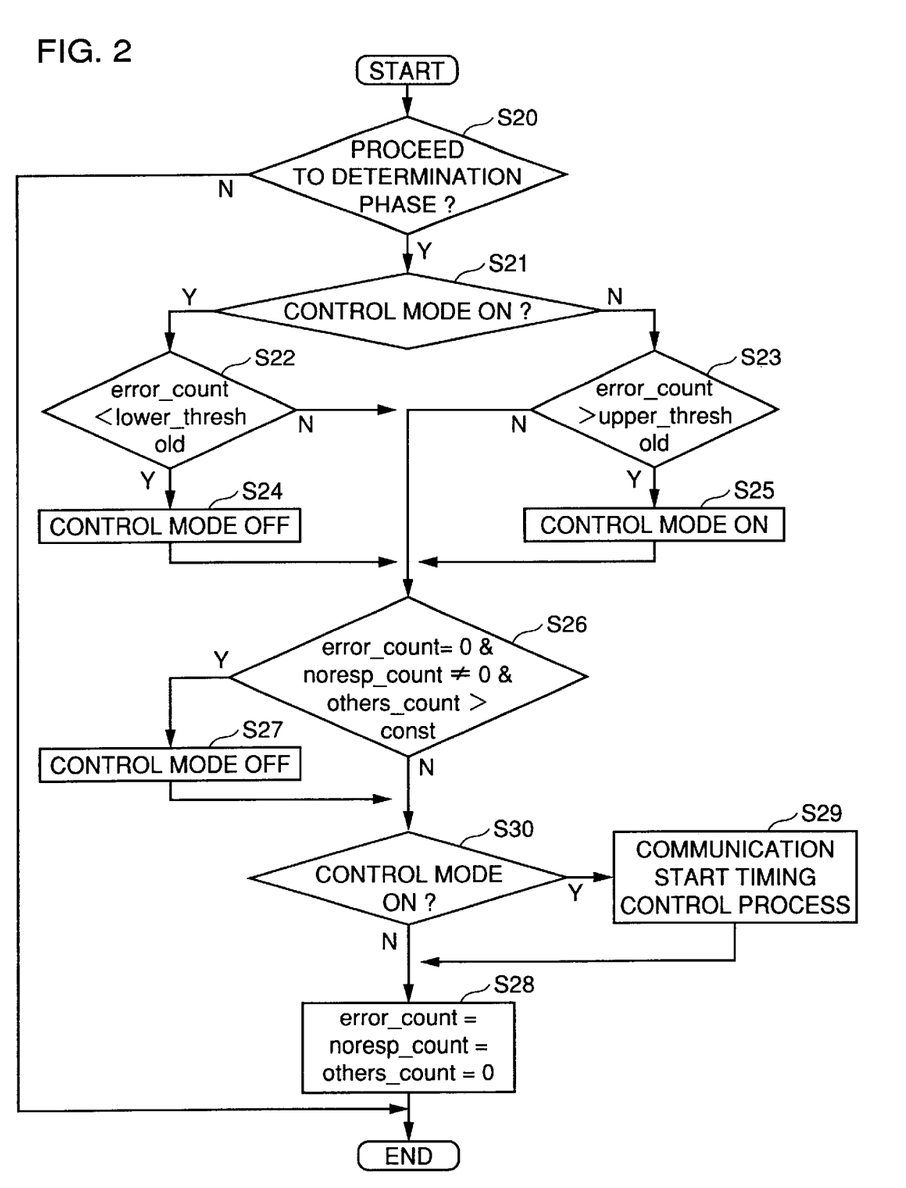
FIG. 2 is a flow chart showing a communication interference suppress algorithm according to a first embodiment of the present invention.

FIG. 2 is a flow chart of the communication interference suppress algorithm realized by determination unit 105 and communication timing control unit 102 in the host according to the embodiment of the present invention.

During a general synchronous communication cycle process, the host carries out a count operation as set forth in the following. Upon detection of communication error, error counter 109 increments its value (variable "error_count"), and keeps the number of occurrences. In the case where a response packet is not received from a peripheral within a defined timing after a control packet has been transmitted to respective registered peripheries, the value of no-response counter 110 (variable "noresp_count") is incremented and the value maintained. At the same time, the value of error counter 109 is also incremented. Here, the counter value may be updated according to the foregoing weight.

When the host detects a packet transmitted from another system, the value of packet counter 108 (variable "others_count") is incremented, and the number of detections is maintained. The interference suppress algorithm is formed on the basis of the values of these counters.

Upon initiation of the process according to the interference suppress algorithm, determination is made whether to proceed to the determination phase of whether to modify the synchronous communication start timing or not (referred to as "determination phase" hereinafter) is made at step S20. Adjustment is provided so that transition to the determination phase is executed every time the synchronous communication cycle ends. The process ends in the case where a constant number of synchronous communication cycles has not ended. Determination of whether to proceed to the determination phase can be made at a constant period of time instead of the constant synchronous communication cycle.

When determination is made of transition to the determination phase at step S20, control proceeds to step S21 to check the currently-set control mode. The control mode is in a sense a switch to define whether to control modification of the synchronous communication start timing at step S29, and is set to an ON or OFF state. When the control mode is OFF in step S21, control proceeds to step S23. When the value of error counter 109 exceeds an upper limit threshold (value of variable "upper threshold"), determination is made that the frequency of communication error occurrence is high. Control proceeds to step S25 to modify the control mode to ON. The value of variable "upper_threshold" is defined depending upon the time corresponding to a constant number of synchronous communication cycles or a constant period of time before entering the determination phase. In comparison with the value of error counter 109, respective values are normalized as the ratio to the whole. In the case where the value of variable "upper_threshold" is not exceeded, the process proceeds to step S26 with the control mode still at OFF.

When the control mode is ON at step S21, control proceeds to step S22. When the value of error counter 109 is lower than a lower limit threshold (variable "lower_threshold"), determination is made that the frequency of communication error occurrence is reduced, and the control mode is set to OFF at step S24. In comparison with the value of error counter 109, the value of variable "lower_threshold" is normalized for usage. In the case where the value is not lower than the value of variable "lower_threshold", control proceeds to step S26 while the control mode is still at ON.

At step S26, collation of the values of error counter 109, no-response counter 110 and packet counter 108 are made. In this collation, determination is made whether the conditions that the value of error counter 109 is 0, the value of no-response counter 110 is not 0, and the value of packet counter 108 exceeds a predetermined value are established or not. If the conditions are established, the control mode is set to OFF at step S27. This OFF setting implies that modification of synchronous communication start timing is suppressed with high priority under the event that there is no data transmission by a packet response from a peripheral within its own system so that the number of communication error occurrence is 0 and a communication packet of another system can be detected. Accordingly, influence to another system can be obviated. After the control mode has been set to OFF, control proceeds to step S30.

A structure may be implemented in which modification of the control mode to OFF when the foregoing conditions are established is determined depending upon a certain probability "p" at step S26. Since the possibility is not zero of the communication status indicated by the foregoing conditions being induced inevitably by the effect of interference even in the case where the foregoing conditions are established, the above-described implementation can be applied to provide a range of selection as to the setting of the control mode. It is to be noted that probability "p" is set to a high value.

As to the constant value that is to be compared with the value of packet counter 108, the number of packets expected to be issued when the host of another system is in operation during the synchronous communication cycle time before entering the determination phase is employed. This value can be altered according to the environment envisaged for the space where the relevant system is present.

When determination is made that the conditions are not satisfied at step S26 control proceeds to step S30. At step S30, the current control mode is detected. In an ON state, control proceeds to step S29 to effect modify control of the synchronous communication start timing. When in an OFF state, control proceeds to step S28.

In modification control of the synchronous communication start timing of step S29, determination unit 105 notifies communication timing control unit 102 designation of modifying the synchronous communication start timing.

Communication timing control unit 102 calculates a random number in a range specified in advance based on the notification, and adds the calculated value to the value indicating the normal synchronous communication start timing. Accordingly, the start of executing synchronous communication is delayed. Since the foregoing range of the random numbers is from 0 to a value indicating the maximum period of a single synchronous communication cycle, the synchronous communication start timing is adjusted within the range that does not exceed the value indicating the maximum period of the synchronous communication cycle.

The range of the random numbers can be defined from 0 to n times the value indicating the maximum period of a single synchronous communication cycle. By defining the value of the random number as an integer multiple (including 0) of a single synchronous communication cycle period, the synchronous communication start timing can be delayed for an integer multiple times of the synchronous communication cycle.

The synchronous communication start timing control process of step S29 may be implemented to measure the time from the start of synchronous communication to the first occurrence of no-packet response from a peripheral or communication error occurrence to control the delay amount of the synchronous communication start timing based on the measured result, differing from the above-described process.

Following step S29, the values of various counters are reset at step S28.

Figure 3:
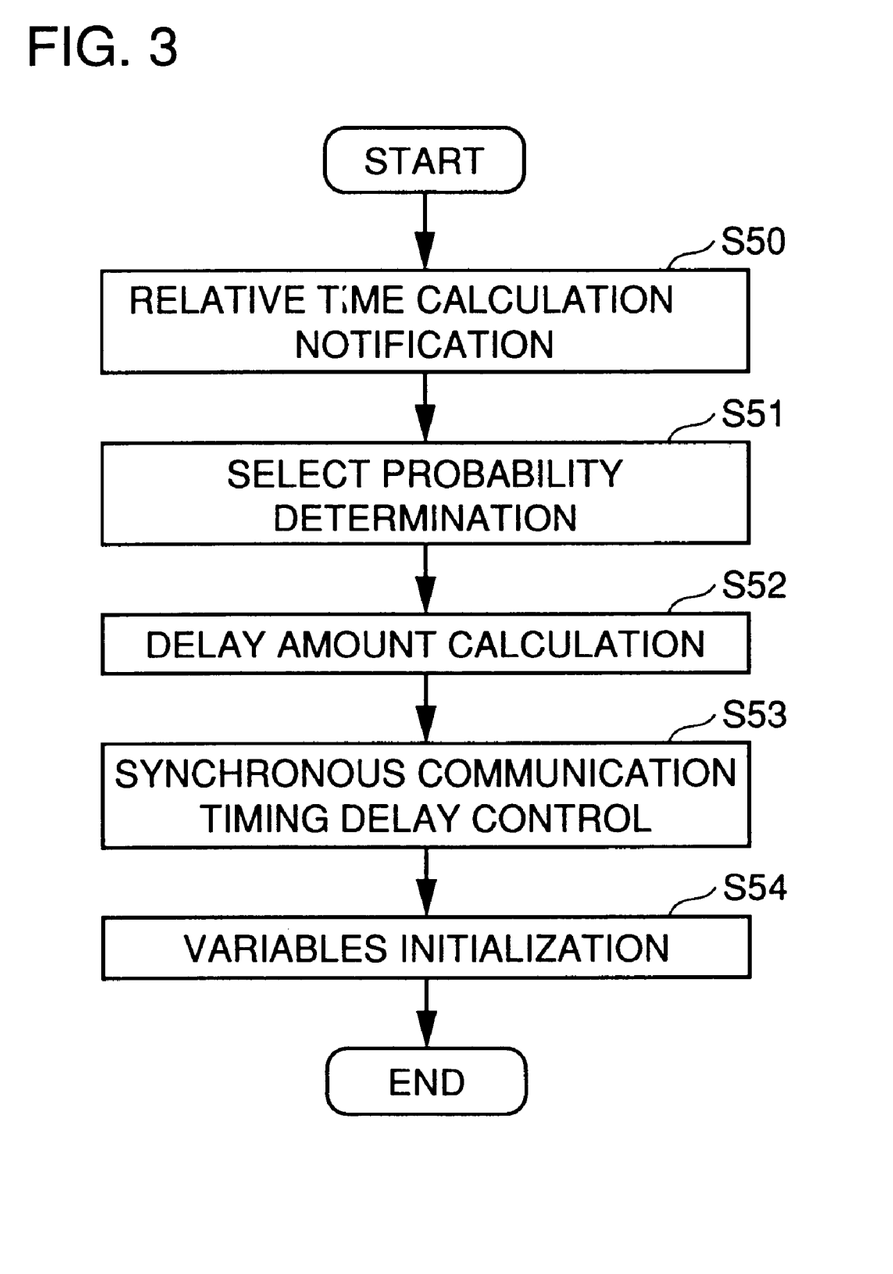
FIG. 3 is a flow chart showing a communication start timing control process algorithm according to delay amount control.

FIG. 3 is a flow chart of the synchronous communication start timing control process algorithm according to the delay amount control as another embodiment of step S29 of FIG. 2.

At step S50 in the flow chart of FIG. 3, determination unit 105 also notifies the relative time information from the start of synchronous communication to the first occurrence of no-packet response from a peripheral or communication error measured by error count unit 103 in notifying designation of modifying the synchronous communication start timing for communication timing control unit 102. A value indicating the ratio of the time from the start of synchronous communication up to the detection of the first no-packet response or communication error to a single synchronous communication cycle time, or a value out of a series of discrete type integers ranked according to the ratio is applied as the relative time information. The value of relative time information is called "r" hereinafter. The information of the immediately-preceding synchronous communication cycle is employed as this relative time information "r".

At step S51, communication timing control unit 102 determines the selection probability to be used in the calculation of the delay amount according to the applied relative time information "r". A probability distribution of gradual reduction taking "r" as an order of points on a defined region is employed. As a result, a selection probability characterized in that the delay amount is increased when "r" is close to 0 (the synchronous communication start timing approaches the start timing corresponding to a single synchronous communication cycle time) and the delay amount approaches 0 as "r" takes a greater value. The reason why the delay amount per se is not determined directly from "r" is to prevent the delay amount from becoming 0 when "r" approximates a large value or to prevent the communication disturbance circumvention caused by interference from being hindered due to a small delay amount.

At step S52, the delay amount is calculated. Using the selection probability determined at step S51, the value from 0 to the maximum time of the single synchronous communication cycle is calculated.

At step S53, the value calculated at step S52 is added to the value of the normal synchronous communication start timing to delay the start of synchronous communication execution.

At step S54, initialization of variables such as relative time information "r" is carried out.

In the present embodiment, the host of FIG. 1C modifies the synchronous communication start timing by an operation according to the flow chart of FIG. 2. In the circumstance where communication disturbance caused by another system is assumed, the host delays the synchronous communication start timing so as to avoid influence of communication disturbance.

In the case where communication error does not occur and there is no packet response from a peripheral within a constant period prior to determining modification of the synchronous communication start timing, and a communication packet of another system is detected for a number of times exceeding a predetermined value within the constant period, determination is made that the possibility of modification of the synchronous communication start timing affecting communication of another system is high, and that there is little merit in modifying the timing for its own system. In this case, the next modification of the synchronous communication start timing is suppressed to avoid adverse affect on the communication of another system caused by modifying the synchronous communication timing.

Counting error is carried out with a relatively low weight applied in the case of no-packet response from a peripheral, and counting of communication error is carried out with a relatively high weight applied in the case of communication error occurrence. Control of the synchronous communication start timing is effected based on the results of the count. Therefore, the synchronous communication start timing can be modified at an early stage according to error occurrence in the event that occurrence of communication error can be identified definitely. In the case where the frequency of packet response from the peripheral is low, the process of modifying the synchronous communication start timing capable of disturbing communication that was properly carried out in another system is suppressed to minimize influence on another system.

By carrying out a synchronous communication start timing control process according to the flow chart of FIG. 3, the time up to detection of communication error can be fed back to the delay amount of the synchronous communication start timing. By increasing and reducing the delay amount when the time up to detection of communication error is short and long, respectively, to gradually reduce the interference period as the interaction between systems encountering interference, recovery from communication disturbance accompanying interference can be carried out with a stable operation.

By using this method, a plurality of synchronous communication systems can coexist in the same space within the usable range of the bandwidth.

Second Embodiment

A second embodiment of the present invention employing an algorithm differing from that of the first embodiment will be described hereinafter. The structure of the system and apparatuses of the second embodiment are identical to those of the first embodiment. The algorithm of the second embodiment is different from the algorithm of the first embodiment.

Figure 4:
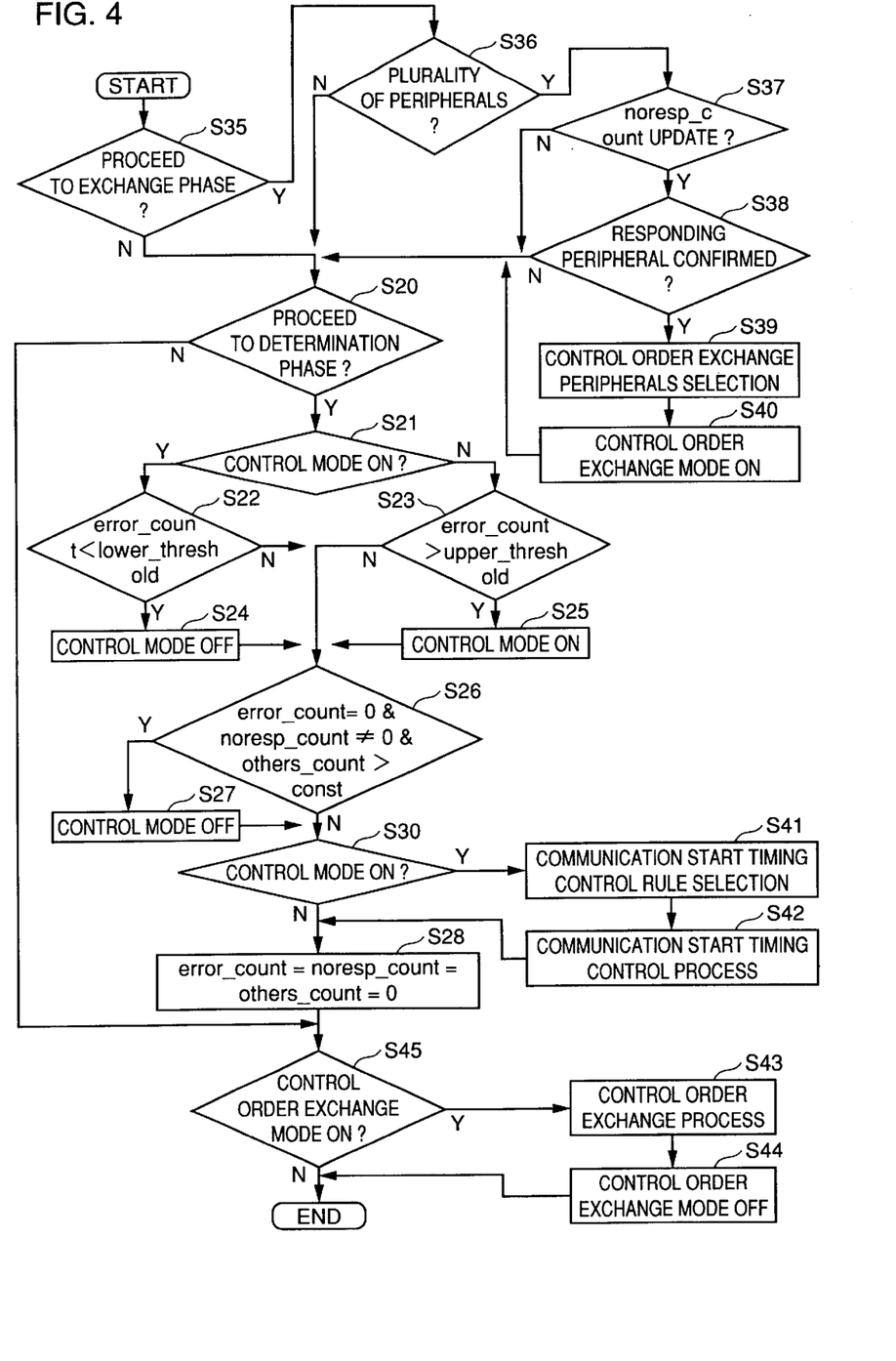
FIG. 4 is a flow chart showing a communication interference suppress algorithm according to a second embodiment of the present invention.

FIG. 4 is a flow chart showing another interference suppress algorithm realized by determination unit 105 and communication timing control unit 102 of the host. Steps identical to those of FIG. 2 have the same step number allotted, and description of corresponding elements will not be repeated.

In the algorithm of FIG. 4, determination unit 105 selects the rule to determine modification of the synchronous communication start timing based on the values counted by error count unit 103 and packet count unit 104, and applies the selected rule to the control of communication timing control unit 102. A mechanism is provided to notify modification of the synchronous communication start timing employing the selected rule and to modify the control order of each peripheral. Also, a function is provided for communication timing control unit 102 to adjust the synchronous communication start timing according to notification of synchronous communication start timing modification.

As described in the first embodiment, the value of error counter 109 (variable "error_count") is incremented and the value maintained when the host detects occurrence of communication error during the normal synchronous communication cycle process. Following transmission of a control packet to each registered peripheral by the host, the value of no-response counter 110 (variable "noresp_count") is incremented and the value maintained when there is no packet response during the defined timing from the peripheral. At the same time, the value of error counter 109 is incremented. Also, the value of packet counter 108 (variable "others_count") is incremented upon detection of a communication packet of another system, and the value maintained.

First, determination is made whether to proceed to a control order exchange phase (referred to as "exchange phase" hereinafter) at step S35. The exchange phase is a phase to determine whether to change the communication control order of the host with respect to the registered peripherals. The communication control order is preassigned for each peripheral. Whether or not to proceed to the exchange phase is determined depending upon whether a predetermined number of synchronous communication cycles has ended or not. In the case where the predetermined number of cycles is set to 1, determination of whether to carry out control order exchange is made immediately after the end of one synchronous communication cycle process. This is advantageous in that the determination result can be immediately reflected to the process of the next synchronous communication cycle in the circumstance where packet responses from the peripherals are guaranteed as long as communication is maintained. Although the predetermined number of cycles is set to 1 here, adjustment is allowed to actuate the exchange phase for every plurality of cycles. It is desirable to set the cycle period required for transition to the exchange phase shorter than that of the determination phase.

When determination is made of not proceeding to the exchange phase at step S35, control proceeds to step S20. When determination is made of transition to the exchange phase with the predetermined number of cycles satisfied, control proceeds to step S36 to check whether communication control towards the plurality of peripherals is currently effected or not. When determination is made that only a single peripheral is under communication control, control proceeds to step S20.

When a plurality of peripherals under communication control are detected at step S36, control proceeds to step S37. The value of no-response counter 110 at the previous exchange phase is compared with the current value to identify whether the value has been updated or not (excluding the case cleared to 0). When the value of no-response counter 110 has not been updated, control proceeds to step S20. When updated, control proceeds to step S38. At step S38, confirmation is made of existence of packet response for all the registered peripherals. If there is no peripheral corresponding to response packet, control proceeds to step S20. Control proceeds to step S39 if at least one peripheral is detected.

Error count unit 103 increments the value of no-response counter 110 upon detection of no-packet response from a peripheral. Also, information indicating which peripheral is absent of packet response is sequentially written into memory 111 in a set with the information identifying each of the peripherals corresponding to no-packet response as the element. At step S39, the peripheral corresponding to change of control order is selected. More specifically, an arbitrary peripheral is selected from the stored set. Also an arbitrary peripheral not corresponding to the stored set out of all the registered peripherals, i.e. the peripheral with packet response, is selected. Information associated with the two selected peripherals are stored in memory 111. At step S40, the control order exchange mode is set to ON to effect control order exchange. Exchange of the control order in the synchronous communication cycle is executed at step S43. Following the ON of the control order exchange mode at step S40, control proceeds to step S20 to determine whether to proceed to the determination phase or not. A process similar to the foregoing is carried out until step S27.

At step S30, determination is made whether the control mode is ON or not. If OFF, control proceeds to step S28 to clear the values of various counters. When the control mode is ON, control proceeds to step S41. Determination unit 105 selects the rule to modify the synchronous communication start timing. At step S41, the values of error counter 109, no-response counter 110 and packet counter 108 are referred to. One rule out of a group of rules applied in advance to determination unit 105 is selected according to the referred result. At step S42, modification of the synchronous communication start timing is effected according to the selected rule.

The rules that can be selected by determination unit 105 are prepared as rules described with the control procedure that can be executed by communication timing control unit 102. The rule selected by determination unit 105 is notified to communication timing control unit 102.

An alternative structure can be employed in which an identification code that is determined in one-to-one correspondence to the selected rule can be notified to communication timing transition unit 102 by determination unit 105, whereby communication timing control unit 102 carries out the control procedure defined in the selected rule according to the notified identification code.

Accordingly, a flexible process can be carried out in addition to simple delay of the synchronous communication start timing by identifying the level of communication traffic with another system according to the referred result of the value of packet counter 108, for example, to delay the synchronous communication start timing according to the identified traffic.

Following the synchronous communication start timing control process of step S42, control proceeds to step S28. A process similar to that described above is carried out at step S28, and then the control order exchange mode state is checked at step S45. If the exchange mode is ON, control proceeds to step S43 to identify one pair of peripherals that is to be subjected to control order exchange according to detection of no-packet response. The exchange control orders of the pair of peripherals is carried out.

Specifically, control order exchange designation is notified from determination unit 105 to communication timing control unit 102. Control order exchange designation includes codes to identify the pair of peripherals that is to be subjected to control order exchange. According to this notification, communication timing control unit 102 carries out the process of replacing the control order for the pair of peripherals in the next synchronous communication cycle. And then, the control order exchange mode is set to OFF at step S44. The series of processes ends, and control returns to the main routine not shown.

In the second embodiment of the present embodiment, the host of the communication system configured as shown in the first embodiment carries out modification of the synchronous communication start timing according to a rule selected as shown in FIG. 4. Synchronous communication start timing control can be effected with flexibility suiting the communication state in the space where the relevant system is present.

In the second embodiment, the host dynamically replaces the control order for the peripheral that is absent of packet response with the control order of another peripheral. Accordingly, identification can be made whether the no-packet response from the peripheral is due to just absence of transmission data or caused by some communication error. The communication timing can be adjusted with high precision.

As described in the foregoing, the host provides control of a peripheral by transmitting a control packet through a transmission unit 100 at every predetermined cycle. After receiving the control packet transmitted from the host, each peripheral transmits a corresponding response packet to carry out synchronous data communication. In the case where the peripheral is absent of transmission data, a response can be made with the packet type indicating data absence, or not respond to the control packet. The host supervises integratedly control using a packet for the peripherals and effecting control at every constant cycle, whereby the synchronous communication timing for the peripheral is adjusted independently, and the communication path with each peripheral in the system is ensured.

Reception unit 101 in the host can receive a packet from a peripheral and also detect a communication packet of another system. A communication packet of another system, when detected, is notified to packet count unit 104. Since the communication packet of another system has a different information in one part of the fields on the packet such as the address or ID to identify the apparatus, identification can be made by checking that part of the field information. Packet count unit 108 counts the number of received packets from another system based on notification thereof.

Error count unit 103 notifies an error packet, if any, such as CRC error caused by some disturbance on the communication path in receiving a packet from a peripheral, and counts the number of occurrences thereof. Also, when a packet response from a peripheral does not arrive within a predetermined time (no-packet response) after transmitting a control packet to that peripheral, the number of occurrences of no-packet response is counted. Determination of no-packet response is made based on the control packet transmission start notification to a peripheral from communication timing control unit 102.

Communication timing control unit 102 controls the synchronous communication timing. Also, communication timing control unit 102 notifies to error count unit 104 transmission of a control packet to a peripheral, or start of synchronous communication timing.

In addition to the above functions, determination unit 105 can, after initiating synchronous communication measured by error count unit 103, determine the relative time during the synchronous communication cycle in the detection of the first occurrence of no-packet response from a peripheral or communication error based on the time up to that occurrence. The delay amount of synchronous communication start timing by communication timing control unit 102 can be adjusted according to the result. Here, communication timing control unit 102 determines a value within a specified range using a probability according to a probability distribution having gradual reduction with the relative time up to occurrence of no-packet response or communication error notified by determination unit 105 as a defined region, and adds that value as the delay time of adjustment for the synchronous communication start timing. In this case, the time up to error detection can be fed back to the delay amount of the synchronous communication start timing. By increasing and reducing the delay amount when the time up to error detection is short and long, respectively, the period of interference can be gradually reduced as the interaction of the systems encountering interference. Therefore, recovery from communication disturbance due to interference can be carried out by a stable operation.

Determination unit 105 may have the function to notify communication timing control unit 102 modification of the peripheral process order within the synchronous communication cycle, and control the timing of communication timing control unit 102 to control the peripheral according to the notified contents. When there is no packet response from the peripheral during a predetermined period, the host replaces the control packet issue order for that peripheral with another peripheral that has packet response in the subsequent synchronous communication cycle. Accordingly, identification can be made more definitely whether the non-packet response from the peripheral is due to simply absence of data to be transmitted or due to some communication error.

The host carries out counting of no-packet response from a peripheral with a relatively low weight, and carries out counting of communication error with a relatively high weight, so that communication timing can be controlled based on the count information. It is therefore possible to proceed to modifying the synchronous communication timing at an early stage in the event where communication error occurrence can be detected definitely. Since no-packet response from a peripheral may include the possibility that the peripheral does not have data to be transmitted, there will be no advantage in modifying the synchronous communication start timing for the system. Furthermore, modification of the start timing may disturb the communication in another system that was properly executed. It is necessary to suppress timing modification in such cases. However, there may be the case where no-packet response is caused by communication disturbance due to interference from another system, but not detected as communication error. Accordingly, low priority is applied to the count of no-packet response to reflect the count value into control of the communication start timing.

In the case where there is no occurrence of communication error, no-packet response from a peripheral, and a communication packet of another system is detected exceeding a predetermined value during a constant period prior to determination of modifying the synchronous communication start timing, the next modification of the synchronous communication start timing can be suppressed intermittently. In the case where there is a high possibility of communication timing control based on detection of no-packet response affecting communication of another system and determination can be made that the timing modification has little advantage for its own system, communication disturbance on other systems can be reduced by the above-described procedure.

Features common to the first and second embodiments will be described hereinafter.

The communication system of the present invention can be applied to the 1-N wireless communication system realized by a single host polling a plurality of peripherals. The present invention is also applicable to a 1-N wireless communication system realized by a single host applying a time slot for response to each of a plurality of peripherals whereby each peripheral responds during the applied time slot period. The communication system can be configured with a personal computer as the host, and a mouse, a keyboard, and the like as peripherals. The communication system can also be configured with hosts such as a television, video-cassette recorder, a laser disk driver, and/or the like, and a remote controller as a peripheral.

Furthermore, the present invention is applicable to an arbitrary 1-N wireless communication system where a signal from a certain host interferes an apparatus of another system in an environment where a plurality of systems are present in addition to the case where the communication system and method of the above embodiments correspond to infrared radiation. A RF (radio frequency) signal may be used as another medium substituting infrared.

The peripheral of the above embodiments may be an element that receives control from the host and initiates or completes response thereto before or within a defined time.

The communication system and host of the present invention can be built using a computer of a simple configuration such as that shown in FIG. 1B. In this case, error count unit 103, packet count unit 104, determination unit 105, and communication timing control unit 102 function by executing a communication control program including the programs according to respective flow charts described previously on the computer.

The foregoing synchronous communication system delays the synchronous communication start timing adaptively according to frequency of occurrence of no-packet response from a peripheral, frequency of communication error occurrence, and information of receiving a packet from another system. As a result, communication disturbance caused by interference with the signal of another system in an environment where another system is present in the same space can be avoided. A plurality of synchronous communication systems can coexist within the usable range of the bandwidth.

In the case where there is no-packet response from a peripheral during a predetermined period in the synchronous communication system, the order of issuing a control packet to that peripheral is replaced with another peripheral that has packet response. As a result, definite identification can be made whether the no-packet response from that peripheral is due to absence of transmission data or caused by communication error. Thus, communication timing control of high accuracy can be carried out.

In the synchronous communication system, communication timing can be controlled according to a control rule selected based on frequency of no-packet response from a peripheral and frequency of communication error occurrence, and information of receiving a packet from another system. Therefore, delicate, flexible, and adaptive control is allowed.

In the synchronous communication system, counting no-packet response from a peripheral is applied with a relatively low weight and counting of communication error occurrence is applied with relatively high weight. The communication timing is controlled on the basis of the counted results. In the status where communication error occurrence can be identified definitely, the synchronous communication timing can be modified at an early stage. In the case no-packet response from a peripheral may be due to absence of transmission data, modification of synchronous communication timing is suppressed from the standpoint of not being advantageous to its own system and adversely affecting the communication of another system. Thus, simple and effective synchronous communication timing control can be provided.

In the case where there is no communication error and no-packet response from a peripheral and presence of another system, i.e. a packet from another system, can be detected, delay of the synchronous communication start timing of its own system is suppressed. As a result, generation of interference as to communication between its own system and another system can be avoided. Influence in communication to another system can be avoided.

In the synchronous communication system, the time from the start of synchronous communication up to occurrence of no-packet response from a peripheral or occurrence of communication error is measured. The delay amount of the synchronous communication start timing is controlled on the basis of the measured result. Information of the time up to error detection is fed back to the delay amount of the synchronous communication start timing. By increasing and reducing the delay amount when the time up to error detection is short and long, respectively, the interference period can be gradually reduced as the interaction between systems encountering interference. Therefore, recovery from communication disturbance caused by interference can be carried out by a stable operation.

All the above features can be achieved by just improving the function of the host in the synchronous communication system. The function of the peripheral does not have to be modified. Therefore, interference suppression of the system can be achieved economically.

Third Embodiment

The previous described operation of the host in the synchronous communication system is realized by a communication control program for synchronous communication.

The communication control program is stored in a computer-readable recording medium. This recording medium may be a memory required to carry out the process with the host of FIG. 1B, for example program memory 13 itself. Alternatively, the recording medium may be a readable program medium by providing a program reader as an external memory device not shown into which a recording medium is introduced. In either case, the program stored in the recording medium may be of a structure that is executed by being accessed by CPU 10, or read out and temporarily loaded in a predetermined program storage area (not shown) of CPU 10 to be read out and executed by CPU 10. It is assumed that this program for loading is prestored in the host.

The program medium is a recording medium formed detachable to the main body of the host, and includes the tape type such as a magnetic tape and cassette tape, a magnetic disk such as a flexible disk or hard disk, an optical disk such as a CD-ROM (Compact Disk-ROM), MO (Magneto Optical Disk), MD (Mini Disk) or DVD (Digital Versatile Disk), the card type such as an IC (Integrated Circuit) card (including memory card), optical card, and a medium that holds a program including a semiconductor memory such as a ROM, EPROM (Erasable and Programmable ROM), EEPROM (Electrically EPROM) or flash ROM.

In the embodiments of the present invention, a structure that can be connected with communication network 16 such as the Internet is employed. Therefore, the recording medium may be a medium that holds a program temporarily such as in the case where a communication control program is downloaded into a predetermined storage area in the apparatus through communication network 16. In the case where a communication control program is downloaded from communication network 16, it is assumed that the program for downloading is stored in advance in a predetermined storage area of the host or installed from another recording medium into the predetermined storage area.

The contents stored in the recording medium is not limited to a program, and may include a data format.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Synchronous communication systems including one control apparatus and at least one controlled apparatus carrying out synchronous communication with said control apparatus under control of said control apparatus in a predetermined order, each of a plurality of said synchronous communication systems is located adjacently, said synchronous communication system comprising in said control apparatus:
   a transmission unit transmitting a packet stored with control information to said at least one controlled apparatus,
   a reception unit receiving at least a packet stored with response corresponding to contents of the packet transmitted by said transmission unit from said at least one controlled apparatus,
   an error count unit counting the numbers of synchronous communication errors occurred and the number of times a packet from said at least one controlled apparatus was not received by said reception unit within a constant period carrying out said synchronous communication with said at least one controlled apparatus,
   a packet count unit counting how many of packets transferred in another said synchronous communication system is received by said reception unit in said constant period, and
   a communication timing adjust unit adjusting timing of said synchronous communication according to a predetermined procedure based on count results of said error count unit and said packet count unit.

2. The synchronous communication system according to claim 1, wherein said communication timing adjust unit comprises
   a determination unit determining whether to adjust timing of said synchronous communication or not according to the count results of said error count unit and said packet count unit, and adjusting timing of said synchronous communication according to said predetermined procedure in response to a determination result of adjustment by said determination unit.

3. The synchronous communication system according to claim 1, wherein said predetermined procedure indicates exchange of said predetermined order between said controlled apparatus which is not received a corresponding packet over said constant period by said reception unit and another said controlled apparatus.

4. The synchronous communication system according to claim 1, wherein said predetermined procedure conforms to a rule selected according to count results of said error count unit and said packet count unit out of one or more different rules prepared in advance to adjust timing of said synchronous communication.

5. The synchronous communication system according to claim 1, wherein said error count unit counts said number of synchronous communication errors with a predetermined weight, and counts said number of times a packet was not received from said at least one controlled apparatus by said reception means with a weight lower than said predetermined weight.

6. The synchronous communication system according to claim 1, wherein said predetermined procedure designates suppression of adjustment of said synchronous communication timing when the count result of said error count unit indicates no occurrence of said error and no reception of a packet from said at, least one controlled apparatus, and the count result of said packet count unit indicates that a packet transmitted in said another synchronous communication system was received by said reception unit.

7. The synchronous communication system according to claim 1, wherein said control apparatus adjusts timing of said synchronous communication according to time information indicating time from start of said synchronous communication up to time of occurrence of said error or time when a packet from said at least one controlled apparatus was not received.

8. A communication interference suppress method to suppress interference of communication in each of a plurality of adjacent synchronous communication systems including one control apparatus and at least one controlled apparatus carrying out synchronous communication with said control apparatus under control of said control apparatus in a predetermined order, said method comprising in said control apparatus:
   a transmission step of transmitting a packet stored with control information to said at least one controlled apparatus,
   a reception step of receiving at least a packet stored with response corresponding to contents of the packet transmitted by said transmission step from said at least one controlled apparatus,
   an error count step of counting the number of said synchronous communication errors occurred and the number of times a packet from said at least one controlled apparatus was not received in said reception step within a constant period carrying out said synchronous communication with said at least one controlled apparatus,
   a packet count step counting how many of packets transferred in another said synchronous communication system is received in said reception step in said constant period, and
   a communication timing adjust step of adjusting timing of said synchronous communication according to a predetermined procedure based on count results of said error count step and said packet count step.

9. A communication apparatus provided at each of a plurality of adjacent synchronous communication systems, each of said plurality of synchronous communication systems including one said communication apparatus, and at least one controlled apparatus carrying out synchronous communication with said communication apparatus and controlled, wherein said communication apparatus comprises a transmission unit transmitting a packet stored with control information to said at least one controlled apparatus, a reception unit receiving at least a packet stored with response corresponding to contents of the packet transmitted by said transmission unit from said at least one controlled apparatus, an error count unit counting the number of synchronous communication errors occurred and the number of times a packet from said at least one controlled apparatus was not received by said reception unit within a constant period carrying out said synchronous communication with said at least one controlled apparatus, a packet count unit counting how many of packets transferred in another said synchronous communication system is received by said reception unit in said constant period, and a communication timing adjust unit adjusting timing of said synchronous communication according to a predetermined procedure based on count results of said error count unit and said packet count unit.

10. A computer-readable recording medium recorded with a communication interference suppress program to be executed with a computer of a communication interference suppress method to suppress interference of communication in each of a plurality of adjacent synchronous communication systems including one control apparatus and at least one controlled apparatus carrying out synchronous communication with said control apparatus under control of said control apparatus in a predetermined order, said communication interference suppress method comprising in said control apparatus:

a transmission step of transmitting a packet stored with control information to said at least one controlled apparatus, a reception step of receiving at least a packet stored with response corresponding to contents of the packet transmitted by said transmission step from said at least one controlled apparatus, an error count step of counting the number of synchronous communication errors occurred and the number of times a packet was not received from said at least one controlled apparatus in said reception step within a constant period carrying out said synchronous communication with said at least one controlled apparatus, a packet count step counting how many of packets transferred in another said synchronous communication system is received in said reception step in said constant period, and a communication timing adjust step of adjusting timing of said synchronous communication according to a predetermined procedure based on count results of s aid error count step and said packet count step.

11. Synchronous communication systems including one control apparatus and at least one controlled apparatus carrying out synchronous communication with said control apparatus under control of said control apparatus in a predetermined order, each of a plurality of said synchronous communication systems is located adjacently, said synchronous communication system comprising in said control apparatus:

a transmission means for transmitting a packet stored with control information to said at least one controlled apparatus, a reception means for receiving at least a packet stored with response corresponding to contents of the packet transmitted by said transmission means from said at least one controlled apparatus, an error count means for counting the numbers of synchronous communication errors occurred and the number of times a packet from said at least one controlled apparatus was not received by said reception means within a constant period carrying out said synchronous communication with said at least one controlled apparatus, a packet count means for counting how many of packets transferred in another said synchronous communication system is received by said reception means in said constant period, and a communication timing adjust means for adjusting timing of said synchronous communication according to a predetermined procedure based on count results of said error count means and said packet count means.

12. A communication apparatus provided at each of a plurality of adjacent synchronous communication systems, each of said plurality of synchronous communication systems including one said communication apparatus, and at least one controlled apparatus carrying out synchronous communication with said communication apparatus and controlled, wherein said communication apparatus comprises a transmission means for transmitting a packet stored with control information to said at least one controlled apparatus, a reception means for receiving at least a packet stored with response corresponding to contents of the packet transmitted by said transmission means from said at least one controlled apparatus, an error count means for counting the number of synchronous communication errors occurred and the number of times a packet from said at least one controlled apparatus was not received by said reception means within a constant period carrying out said synchronous communication with said at least one controlled apparatus, a packet count means for counting how many of packets transferred in another said synchronous communication system is received by said reception means in said constant period, and a communication timing adjust means for adjusting timing of said synchronous communication according to a predetermined procedure based on count results of said error count means and said packet count means.

* * * * *